United States Patent
Jeon et al.

(10) Patent No.: US 12,007,918 B2
(45) Date of Patent: Jun. 11, 2024

(54) PERIPHERAL COMPONENT INTERCONNECT EXPRESS INTERFACE DEVICE AND METHOD OF OPERATING THE SAME

(71) Applicant: SK hynix Inc., Icheon (KR)

(72) Inventors: Yong Tae Jeon, Icheon (KR); Ji Woon Yang, Icheon (KR); Sang Hyun Yoon, Icheon (KR); Se Hyeon Han, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 17/467,070

(22) Filed: Sep. 3, 2021

(65) Prior Publication Data

US 2022/0309014 A1 Sep. 29, 2022

(30) Foreign Application Priority Data

Mar. 23, 2021 (KR) .................. 10-2021-0037503

(51) Int. Cl.
*G06F 13/00* (2006.01)
*G06F 13/24* (2006.01)
*G06F 13/42* (2006.01)

(52) U.S. Cl.
CPC .......... *G06F 13/24* (2013.01); *G06F 13/4221* (2013.01); *G06F 2213/0026* (2013.01)

(58) Field of Classification Search
CPC ............... G06F 13/24; G06F 13/4221; G06F 2213/0026; G06F 2213/28; G06F 2213/2802; G06F 2213/2806; G06F 2213/2804
See application file for complete search history.

(56) References Cited

U.S. PATENT DOCUMENTS

| | | |
|---|---|---|
| 7,852,757 B1 | 12/2010 | Puranik |
| 8,199,759 B2 | 6/2012 | Singhal et al. |
| 9,996,484 B1 | 6/2018 | Davis et al. |
| 10,176,126 B1 | 1/2019 | Banerjee et al. |
| 2006/0168384 A1 | 7/2006 | Radhakrishnan et al. |
| 2006/0242332 A1 | 10/2006 | Johnsen et al. |

(Continued)

FOREIGN PATENT DOCUMENTS

| | | |
|---|---|---|
| JP | 2007065847 A | 3/2007 |
| JP | 2015-503154 A | 1/2015 |

(Continued)

OTHER PUBLICATIONS

Office Action dated Sep. 6, 2022 for U.S. Appl. No. 17/467,054.

(Continued)

*Primary Examiner* — Henry Tsai
*Assistant Examiner* — Kim T Huynh (57) ABSTRACT

Provided are a Peripheral Component Interconnect Express (PCIe) interface device and a method of operating the same. The PCIe interface device may include a performance analyzer and a traffic class controller. The performance analyzer may be configured to measure throughputs of multiple functions executed on one or more Direct Memory Access (DMA) devices. The traffic class controller may be configured to allocate traffic class values to transaction layer packets received from the multiple functions based on the throughputs of the multiple functions.

18 Claims, 9 Drawing Sheets

(56) References Cited

U.S. PATENT DOCUMENTS

| | | |
|---|---|---|
| 2007/0220193 A1 | 9/2007 | Ikeda et al. |
| 2008/0301605 A1 | 12/2008 | Ando et al. |
| 2009/0049256 A1 | 2/2009 | Hughes et al. |
| 2009/0103434 A1 | 4/2009 | Madsen et al. |
| 2010/0250785 A1 | 9/2010 | Shin et al. |
| 2011/0134915 A1 | 6/2011 | Srinivasan |
| 2011/0289242 A1* | 11/2011 | Srinivasan ............ G06F 13/102 710/22 |
| 2012/0005300 A1* | 1/2012 | Muppalla ................ G06F 13/24 709/212 |
| 2012/0072679 A1 | 3/2012 | Biswas et al. |
| 2014/0237156 A1 | 8/2014 | Regula et al. |
| 2014/0281053 A1 | 9/2014 | Suzuki et al. |
| 2014/0281099 A1* | 9/2014 | Avez ................... G06F 13/385 710/308 |
| 2016/0162436 A1 | 6/2016 | Raghavan et al. |
| 2017/0123730 A1 | 5/2017 | Losh |
| 2018/0293101 A1 | 10/2018 | Park et al. |
| 2019/0058675 A1 | 2/2019 | Schubert et al. |
| 2019/0113957 A1 | 4/2019 | Chiu et al. |
| 2019/0146684 A1 | 5/2019 | Benisty et al. |
| 2019/0179784 A1* | 6/2019 | Tsuji ................... G06F 13/4031 |
| 2019/0354300 A1 | 11/2019 | Benisty et al. |
| 2020/0065028 A1 | 2/2020 | Keil et al. |
| 2020/0293499 A1* | 9/2020 | Kohli ................... G06F 3/0604 |
| 2020/0304426 A1* | 9/2020 | Zhao ....................... H04L 12/66 |
| 2021/0075732 A1* | 3/2021 | Singh ................. H04L 47/2425 |
| 2021/0224210 A1* | 7/2021 | Ouyang ................ G06F 9/4411 |
| 2022/0124051 A1 | 4/2022 | Brewer et al. |

FOREIGN PATENT DOCUMENTS

| | | |
|---|---|---|
| JP | 2019505924 A | 2/2019 |
| KR | 10-2004-0029010 A | 4/2004 |
| KR | 10-2016-0075312 A | 6/2012 |
| KR | 10-1414079 B1 | 7/2014 |
| KR | 10-2016-0016557 A | 2/2016 |
| KR | 10-2018-0019567 A | 2/2018 |
| KR | 102019032716 A | 3/2019 |
| KR | 10-2020-0016810 A | 2/2020 |
| KR | 1020200073592 A | 6/2020 |
| KR | 102238652 B1 | 4/2021 |

OTHER PUBLICATIONS

Office Action dated Jan. 12, 2023 for U.S. Appl. No. 17/467,078.
Notice of Allowance dated Sep. 7, 2023 regarding U.S. Appl. No. 17/467,078.
Office Action dated Feb. 21, 2023 for U.S. Appl. No. 17/467,054.

* cited by examiner

| VC Configurations | TC/VC Mapping Options |
|---|---|
| VC0 | TC(0-7)/VC0 |
| VC0, VC1 | TC(0-6)/VC0, TC7/VC1 |
| VC0-VC3 | TC(0-1)/VC0, TC(2-4)/VC1, TC(5-6)/VC2, TC7/VC3 |
| VC0-VC7 | TC[0:7]/VC[0:7] |
| Notes on conventions: | |
| TCn/VCk | TCn mapped to VCk |
| TC(n-m)/VCk | All TCs in the range n-m mapped to VCk (i.e., to the same VC) |
| TC[n:m]/VC[n:m] | TCn/VCn, TCn+1/VCn+1, ···, TCm/VCm |

PERIPHERAL COMPONENT INTERCONNECT EXPRESS INTERFACE DEVICE AND METHOD OF OPERATING THE SAME

CROSS-REFERENCE TO RELATED APPLICATION

The present application claims priority under 35 U.S.C. § 119(a) to Korean patent application number 10-2021-0037503, filed on Mar. 23, 2021, in the Korean Intellectual Property Office, the entire disclosure of which is incorporated herein by reference.

BACKGROUND

1. Technical Field

Various embodiments of the present disclosure generally relate to an electronic device, and more particularly to a PCIe interface device and a method of operating the PCIe interface device.

2. Related Art

Peripheral Component Interconnect Express (PCIe) is an interface having a serial structure for data communication. A PCIe-based storage device supports a multi-port structure and a multi-function structure. The PCIe-based storage device may be virtualized or non-virtualized, and may achieve Quality of Service (QoS) of a host input/output (I/O) command through one or more PCIe functions.

A storage device is a device which stores data under the control of a host device such as a computer or a smartphone. The storage device may include a memory device in which data is stored and a memory controller which controls the memory device. Memory devices are classified into a volatile memory device and a nonvolatile memory device.

The volatile memory device is a memory device in which data is stored only when power is supplied and in which stored data is lost when the supply of power is interrupted. Examples of the volatile memory device may include a static random access memory (SRAM) and a dynamic random access memory (DRAM).

The nonvolatile memory device may be a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), and a flash memory.

SUMMARY

Various embodiments of the present disclosure are directed to a PCIe interface device that provides uniform quality of service (QoS) for respective functions and a method of operating the PCIe interface device.

An embodiment of the present disclosure may provide for a Peripheral Component Interconnect Express (PCIe) interface device. The PCIe interface device may include a performance analyzer and a traffic class controller. The performance analyzer may be configured to measure throughputs of multiple functions executed on one or more Direct Memory Access (DMA) devices. The traffic class controller may be configured to allocate traffic class values to transaction layer packets received from the multiple functions based on the throughputs of the multiple functions.

An embodiment of the present disclosure may provide for a method of operating a Peripheral Component Interconnect Express (PCIe) interface device. The method may include measuring throughputs of multiple functions executed on one or more Direct Memory Access (DMA) devices, and allocating traffic class values to transaction layer packets received from the multiple functions based on the throughputs of the multiple functions.

DETAILED DESCRIPTION

Specific structural or functional descriptions in the embodiments of the present disclosure introduced in this specification or application are exemplified to describe embodiments according to the concept of the present disclosure. The embodiments according to the concept of the present disclosure may be practiced in various forms, and should not be construed as being limited to the embodiments described in the specification or application.

Figure 1:
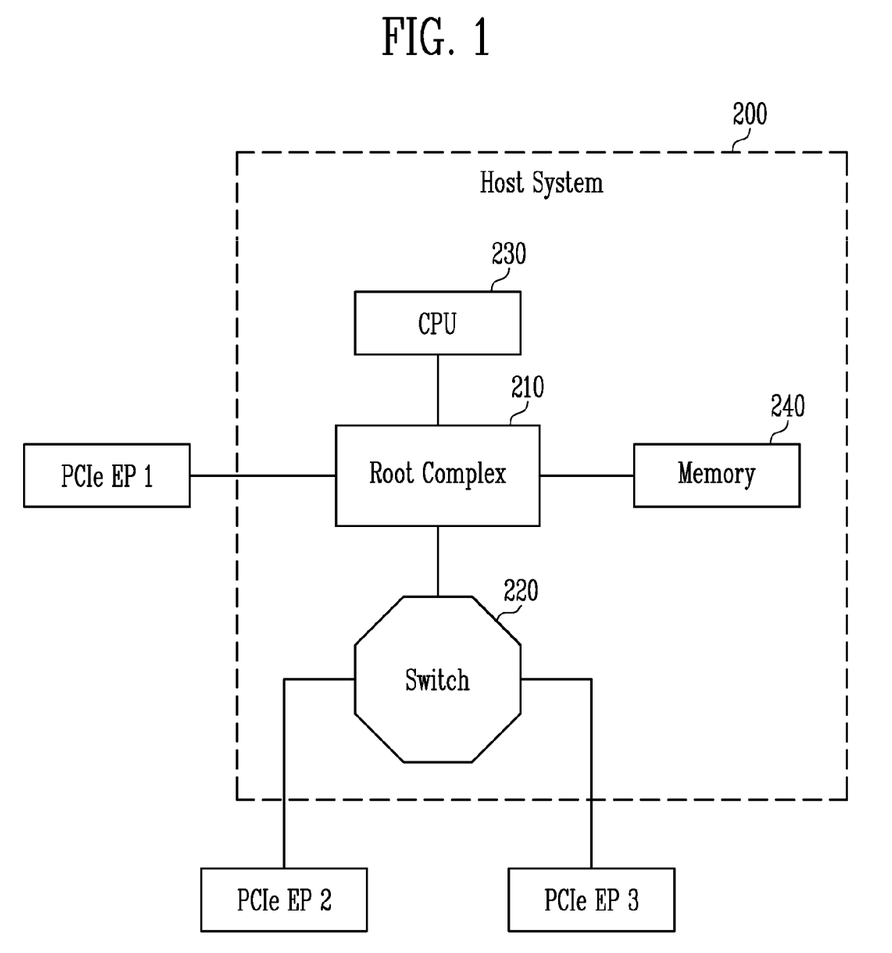
FIG. 1 illustrates a communication structure between a host system and PCIe endpoints according to an embodiment of the present disclosure.

FIG. 1 illustrates a communication structure between a host system and a plurality of PCIe endpoints (EPs) according to an embodiment of the present disclosure.

Referring to FIG. 1, a host system 200 may include a root complex 210, a switch 220, a Central Processing Unit (CPU) 230, and a memory 240.

The root complex 210 may couple the CPU 230 and the memory 240 to an input/output (I/O) hierarchy. The root complex 210 may include at least one host bridge and at least one root port. The root complex 210 may support one or more PCIe ports.

The root complex 210 may support input/output (I/O) requests. The root complex 210 must support generation of configuration requests. The root complex 210 must not support lock semantics as a completer. The root complex 210 may request generation of a locked request as a requester.

The switch 220 may couple at least two ports to each other so as to route transaction layer packets. The switch 220 may be a set of virtual PCI-to-PCI bridge devices. The switch 220 may be composed of two or more logical PCI-to-PCI bridges. The switch 220 may route a transaction using a PCI bridge mechanism (i.e., an address-based multicasting manner). The switch 220 must route all types of transaction layer packets between all ports. The switch 220 must support a locked request. Each enabled port of the switch 220 must support a flow control. The switch 220 may arbitrate a contention in a round robin or weighted round robin manner when the contention occurs on the same virtual channel.

Each PCIe endpoint (EP) may function as a requester or a completer of a PCIe transaction.

In FIG. 1, a first PCIe endpoint (PCIe EP 1) may transmit and receive transaction layer packets to and from the root complex 210. Second and third PCIe endpoints (PCIe EP 2 and PCIe EP3) may transmit and receive transaction layer packets to and from the switch 220.

The switch 220 may route the transaction layer packets, received from the second and third PCIe endpoints (PCIe EP 2 and PCIe EP3), to the root complex 210. The switch 220 may route transaction layer packets, received from the root complex 210, to the second and third PCIe endpoints (PCIe EP 2 and PCIe EP3).

Therefore, the root complex 210 may transmit and receive transaction layer packets directly to and from the first PCIe endpoint (PCIe EP 1). The root complex 210 may transmit and receive transaction layer packets to and from the second and third PCIe endpoints (PCIe EP 2 and PCIe EP3) through the switch 220. The root complex 210 may forward the transaction layer packets, received from the first to third PCIe endpoints (PCIe EP 1 to PCIe EP3), to the CPU 230 or the memory 240.

Figure 2:
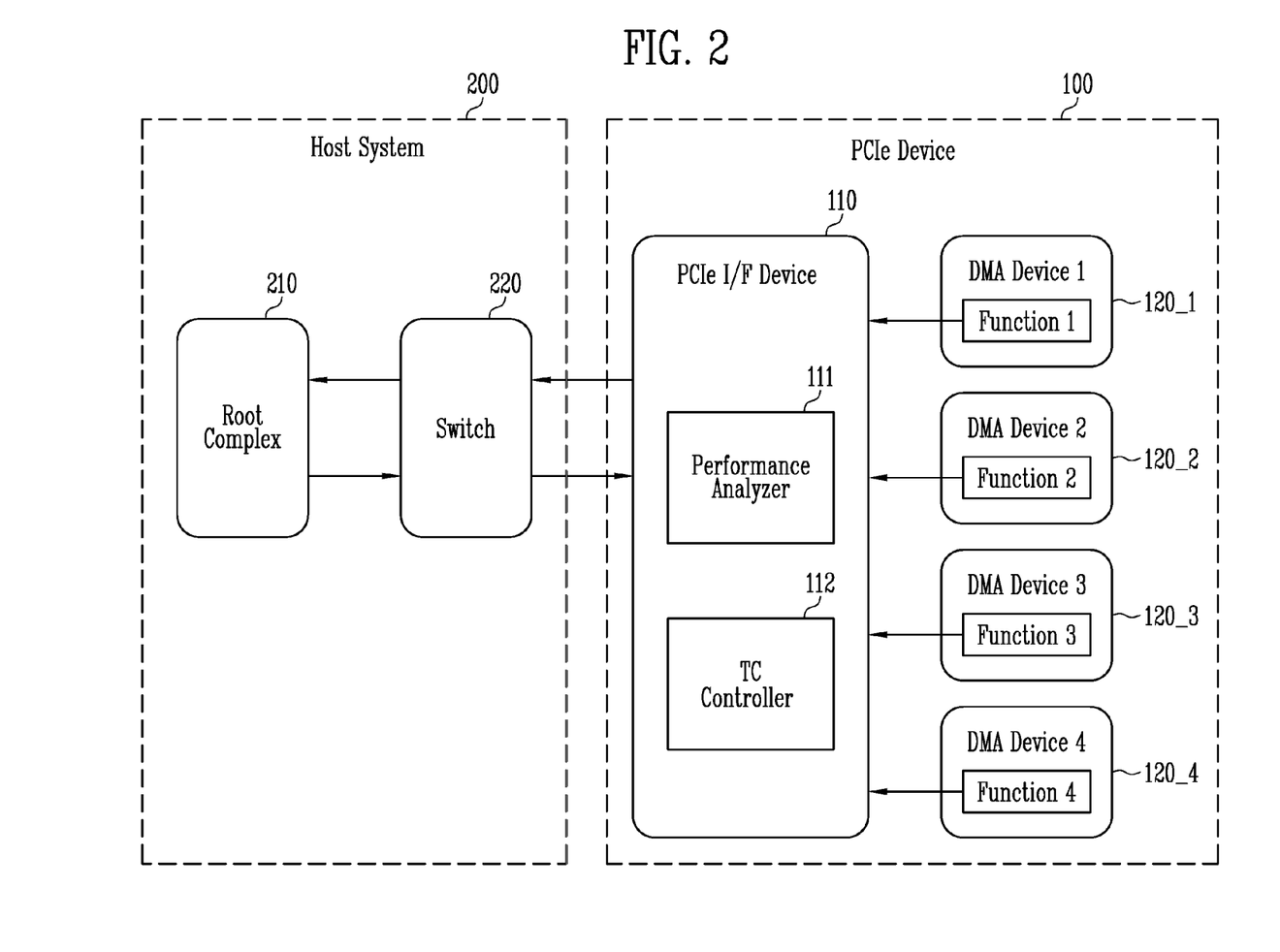
FIG. 2 illustrates the configuration and operation of a PCIe device according to an embodiment of the present disclosure.

FIG. 2 illustrates the configuration and operation of a PCIe device according to an embodiment of the present disclosure.

Referring to FIG. 2, a PCIe device 100 may include a PCIe interface (I/F) device 110 and one or more Direct Memory Access (DMA) devices, e.g., 120_1 to 120_4. The PCIe device 100 may be a PCIe endpoint described above with reference to FIG. 1. A host system 200 may include a root complex 210, a switch 220, a CPU (not illustrated), and a memory (not illustrated), similarly to the description made with reference to FIG. 1.

The PCIe interface device 110 may receive transaction layer packets from multiple functions (Function 1 to Function 4) respectively executed on the DMA devices 120_1 to 120_4. The PCIe interface device 110 may route the received transaction layer packets to the switch 220 of the host system 200. The PCIe interface device 110 may dynamically allocate traffic class values to the received transaction layer packets based on throughputs of the respective functions. Traffic classes may be labels of transaction layer packets that are routed between unmodified endpoints.

The PCIe interface device 110 may include a performance analyzer 111 and a traffic class (TC) controller 112.

The performance analyzer 111 may measure the throughputs of the multiple functions respectively executed on the DMA devices 120_1 to 120_4. The multiple functions may share a data path, which couples the DMA devices 120_1 to 120_4 to the PCIe interface device 110, with each other. The performance analyzer 111 may calculate the throughputs of the multiple functions based on occupation rates of the multiple functions for the data path. The performance analyzer 111 may calculate an occupation rate of a function based on the number of transaction layer packets corresponding to the function processed through the data path per unit time.

The traffic class controller 112 may dynamically allocate traffic class values to transaction layer packets received from the multiple functions based on the throughputs of the multiple functions. Whenever a ranking of the throughputs of the multiple functions varies, the traffic class controller 112 may reallocate traffic class values to the transaction layer packets based on the varied ranking.

The traffic class controller 112 may allocate a preset default value as initial values for traffic classes of the transaction layer packets received from the multiple functions.

The traffic class controller 112 may allocate different traffic class values to the transaction layer packets based on results of comparing the throughputs of the multiple functions with a threshold value. The traffic class controller 112 may allocate a default value as traffic class values of transaction layer packets received from a function having a throughput that is greater than the threshold value, among the multiple functions. The traffic class controller 112 may determine a ranking of traffic class values of transaction layer packets received from functions having throughputs that are less than or equal to the threshold value, among the multiple functions, in a reverse order of the ranking of the throughputs of the multiple functions. An embodiment for allocating traffic class values will be described in detail later with reference to FIG. 7. In an embodiment, the preset default value may be the same as the default value.

The traffic class controller 112 may allocate the default value as traffic class values of transaction layer packets received from an interrupted function among the multiple functions.

As will be described later with reference to FIG. 6, the switch 220 or the root complex 210 may determine virtual channels to be mapped to the transaction layer packets according to the allocated traffic class values. The switch 220 or the root complex 210 may determine an order in which the transaction layer packets are to be output to the outside according to the virtual channels mapped to the transaction layer packets.

The DMA devices 120_1 to 120_4 may include one or more of a Non-Volatile Memory Express (NVMe) device, a Solid State Drive (SSD) device, an Artificial Intelligence Central Processing Unit (AI CPU), an Artificial Intelligence System on Chip (AI SoC), an Ethernet device, a sound card, a graphics card, and so on. However, the DMA devices 120_1 to 120_4 are not limited thereto, and may include other types of electronic devices employing a PCIe interface. Functions may be executed on the DMA devices 120_1 to 120_4, and may be software or firmware which processes transactions of transaction layer packets.

For each of the DMA devices 120_1 to 120_4, one or more functions may be executed. In FIG. 2, one function may be executed on each of the DMA devices 120_1 to 120_4.

For example, a first function (Function 1) may be executed on the first DMA device 120_1. A second function (Function 2) may be executed on the second DMA device 120_2. A third function (Function 3) may be executed on the third DMA device 120_3. A fourth function (Function 4) may be executed on the fourth DMA device 120_4.

However, the number of functions executed on each DMA device is not limited to the present embodiment. For example, the PCIe device 100 may generate a physical function or a virtual function in response to a virtualization request received from the host system 200. The PCIe device 100 may allocate the generated functions to respective DMA devices. The number of functions allocated to and executed on each DMA device may be individually set. Therefore, one or more functions may be allocated to one DMA device, and each of the one or more functions may be executed as an independent operation unit.

Figure 3:
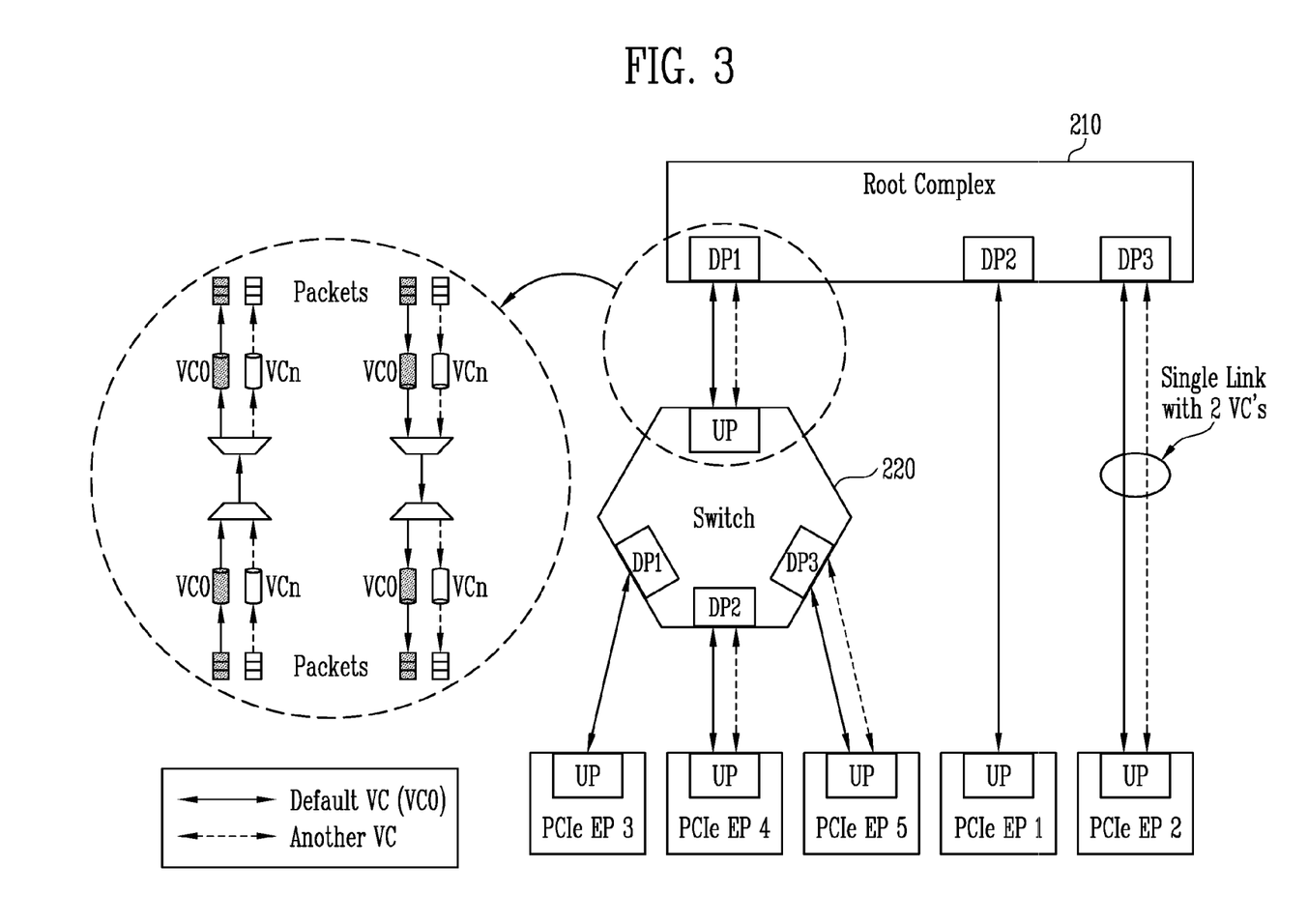
FIG. 3 illustrates virtual channels in a PCIe link.

FIG. 3 illustrates virtual channels (VCs) in a PCIe link.

Referring to FIG. 3, upstream ports UP of PCIe endpoints (PCIe EP 1 to PCIe EP 5) may be coupled to downstream ports DP of a root complex 210 or downstream ports DP of a switch 220. Upstream ports UP of the switch 220 may be coupled to downstream ports DP of the root complex 210.

In FIG. 3, an upstream port UP of a first PCIe endpoint (PCIe EP 1) may be coupled to a second downstream port DP2 of the root complex 210. An upstream port UP of a second PCIe endpoint (PCIe EP 2) may be coupled to a third downstream port DP3 of the root complex 210.

The first PCIe endpoint (PCIe EP 1) may communicate with the root complex 210 through a single link with which a single virtual channel is established. A virtual channel may be set to a default channel VC0.

The second PCIe endpoint (PCIe EP 2) may communicate with the root complex 210 through a single link with which two virtual channels are established. The two virtual channels may include a default channel VC0 and another virtual channel. The number of virtual channels that can be established with a single link is not limited to the present embodiment.

An upstream port UP of a third PCIe endpoint (PCIe EP 3) may be coupled to a first downstream port DP1 of the switch 220. An upstream port UP of a fourth PCIe endpoint (PCIe EP 4) may be coupled to a second downstream port DP2 of the switch 220. An upstream port UP of a fifth PCIe endpoint (PCIe EP 5) may be coupled to a third downstream port DP3 of the switch 220. An upstream port UP of the switch 220 may be coupled to a first downstream port DP1 of the root complex 210.

The third to fifth PCIe endpoints (PCIe EP 3 to PCIe EP 5) may communicate with the root complex 210 through the switch 220.

The third PCIe endpoint (PCIe EP 3) may communicate with the switch 220 through a single link with which one virtual channel is established. The virtual channel may be set to a default channel VC0. The fourth PCIe endpoint (PCIe EP 4) may communicate with the switch 220 through a single link with which two virtual channels are established. The two virtual channels may include a default channel VC0 and another virtual channel. The fifth PCIe endpoint (PCIe EP 5) may communicate with the switch 220 through a single link with which two virtual channels are established. The two virtual channels may include a default channel VC0 and another virtual channel.

The switch 220 may communicate with the root complex 210 through a single link with which two virtual channels are established. The two virtual channels may include a default channel VC0 and another virtual channel.

Figure 4:
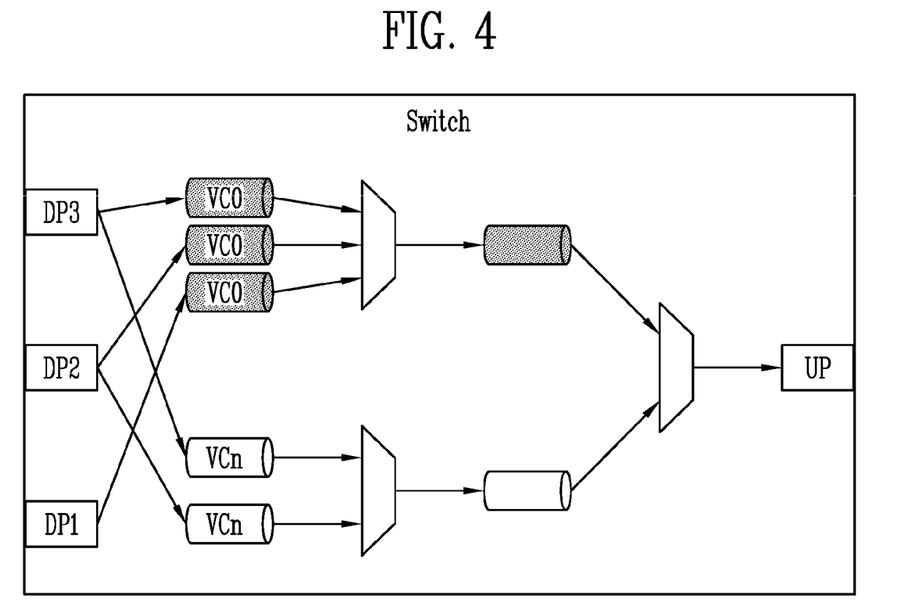
FIG. 4 illustrates virtual channels in a switch of FIG. 3.

FIG. 4 illustrates virtual channels in the switch of FIG. 3.

Referring to FIG. 4, the switch may include first to third downstream ports DP1 to DP3 and an upstream port UP.

A transaction layer packet received from the first downstream port DP1 may be forwarded to the upstream port UP through a default channel VC0. A transaction layer packet received from the second downstream port DP2 may be forwarded to the upstream port UP through a default channel VC0 and an additional virtual channel VCn (where n is a natural number). A transaction layer packet received from the third downstream port DP3 may be forwarded to the upstream port UP through a default channel VC0 and an additional virtual channel VCn.

An order in which the transaction layer packets received through the default channel VC0 and the additional virtual channel VCn are to be output to the outside through the upstream port UP may be determined based on internal configuration information of the switch. For example, a transaction layer packet received through the additional virtual channel VCn may be output through the upstream port UP to the outside of the switch before a transaction layer packet received through the default channel VC0 is output to the outside.

Figure 5:
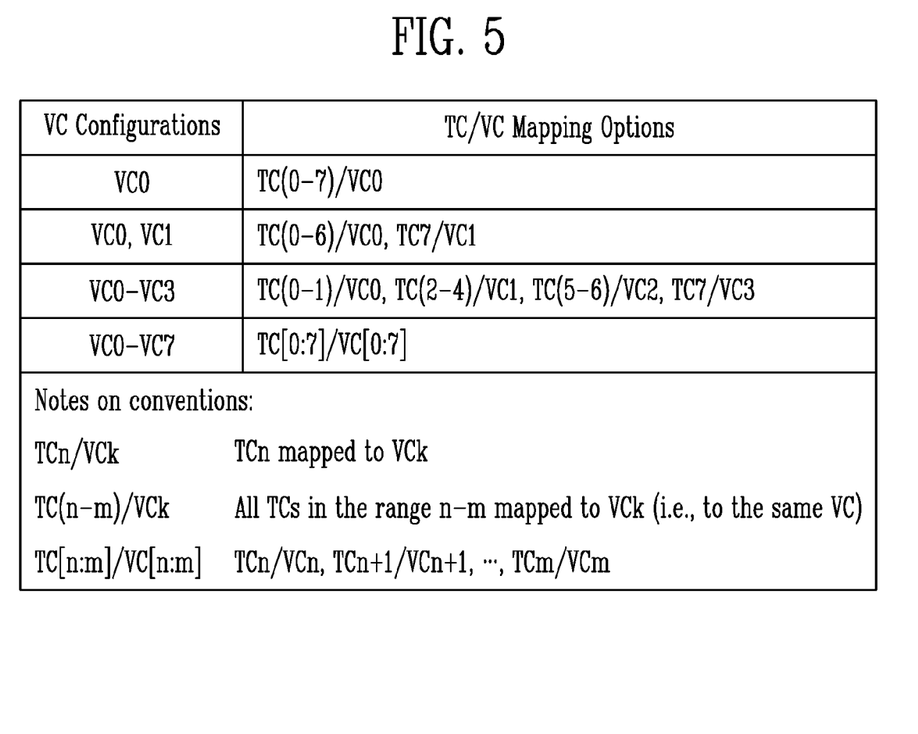
FIG. 5 illustrates a mapping table between virtual channels and traffic classes according to an embodiment of the present disclosure.

FIG. 5 illustrates a mapping table between virtual channels and traffic classes according to an embodiment. Referring to FIG. 5, a virtual channel mechanism may provide differentiated traffic to the overall fabric using different traffic classes. The reason for this is to prevent the occurrence of a bottleneck phenomenon caused by the use of a single traffic.

In an embodiment, one traffic class may be mapped to one virtual channel. In another embodiment, a plurality of traffic classes may be mapped to a single virtual channel. In another embodiment, the traffic classes may be mapped only to one virtual channel. That is, a single traffic class cannot be mapped to two or more virtual channels. A default value for the traffic classes may be TC0, and a default channel for the virtual channels may be VC0.

In FIG. 5, all of traffic classes TC0 to TC7 may be mapped to the default channel VC0.

When the traffic classes TC0 to TC7 are mapped to the virtual channels VC0 and VC1, the traffic classes TC0 to TC6 may be mapped to the default channel VC0, and the traffic class TC7 may be mapped to the virtual channel VC1.

When the traffic classes TC0 to TC7 are mapped to the virtual channels VC0 to VC3, the traffic classes TC0 and TC1 may be mapped to the default channel VC0, the traffic classes TC2 to TC4 may be mapped to the virtual channel VC1, the traffic classes TC5 and TC6 may be mapped to the virtual channel VC2, and the traffic class TC7 may be mapped to the virtual channel VC3.

The traffic classes TC0 to TC7 may be mapped in one-to-one correspondence to the virtual channels VC0 to VC7, respectively.

The number of virtual channels and the number of traffic classes are not limited to the present embodiment shown in FIG. 5.

Figure 6:
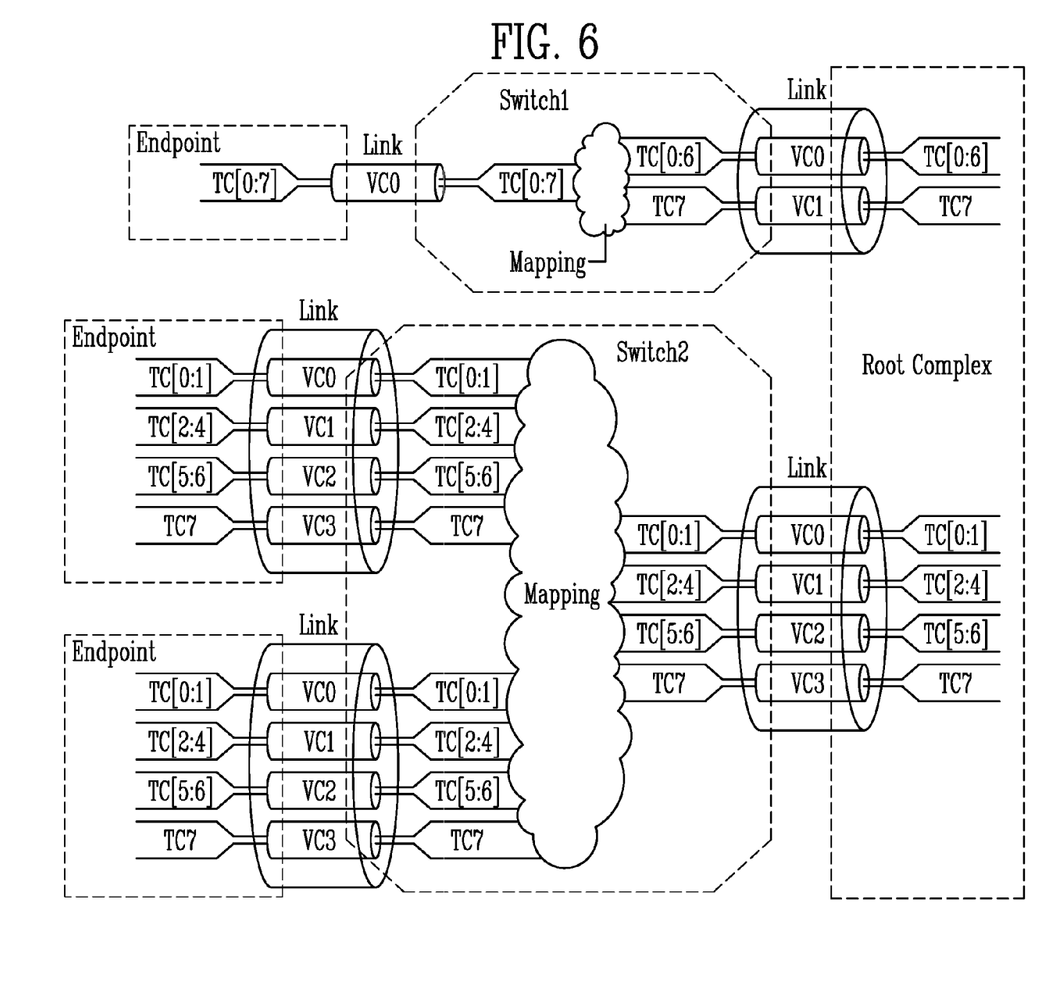
FIG. 6 illustrates a mapping structure between virtual channels and traffic classes depending on the mapping table described in FIG. 5.

FIG. 6 illustrates a mapping structure between virtual channels and traffic classes depending on the mapping table described in FIG. 5.

Referring to FIG. 6, transaction layer packets are routed through virtual channels mapped to traffic classes depending on traffic class values allocated to the transaction layer packets, and thus a transaction between components may be performed. Here, a switch or a root complex may perform ordering between the transaction layer packets depending on the traffic class values.

An independent logical data flow may be provided from a specific physical resource through virtual channels. For example, when a plurality of virtual channels are established in a single physical link, independent logical data flows may be provided for respective virtual channels.

The switch may route the transaction layer packets received through a link to the root complex. The switch may include a mapping table between traffic classes and virtual channels as configuration information. The configuration information of the switch may be changed in response to a request from a host system. The mapping table may be set differently for respective switches. The switch may assign a virtual channel through which a transaction layer packet is to be transmitted depending on a traffic class value allocated to the transaction layer packet.

For example, a first switch (Switch 1) may map traffic classes TC[0:6] to a virtual channel VC0, and may map a traffic class TC7 to a virtual channel VC1. Therefore, a transaction layer packet having traffic classes TC[0:6] may be routed to the root complex through the virtual channel VC0. A transaction layer packet having the traffic class TC7 may be routed to the root complex through the virtual channel VC1. Depending on the configuration information of the first switch (Switch 1), the priorities or outputting order of transaction layer packets that are to be routed through the virtual channel VC0 and the virtual channel VC1 to the root complex may be determined.

A second switch (Switch 2) may map traffic classes TC[0:1] to a virtual channel VC0, map traffic classes TC[2:4] to a virtual channel VC1, map traffic classes TC[5:6] to a virtual channel VC2, and map traffic class TC7 to a virtual channel VC3.

As described above in relation to a process in which the first switch routes transaction layer packets, the transaction layer packets may be routed to the root complex through the virtual channels mapped to the traffic classes depending on the traffic class values. Depending on the configuration information of the second switch (Switch 2), the priorities or outputting order of transaction layer packets that are to be routed through the virtual channels VC0 to VC3 to the root complex may be determined.

Figure 7:
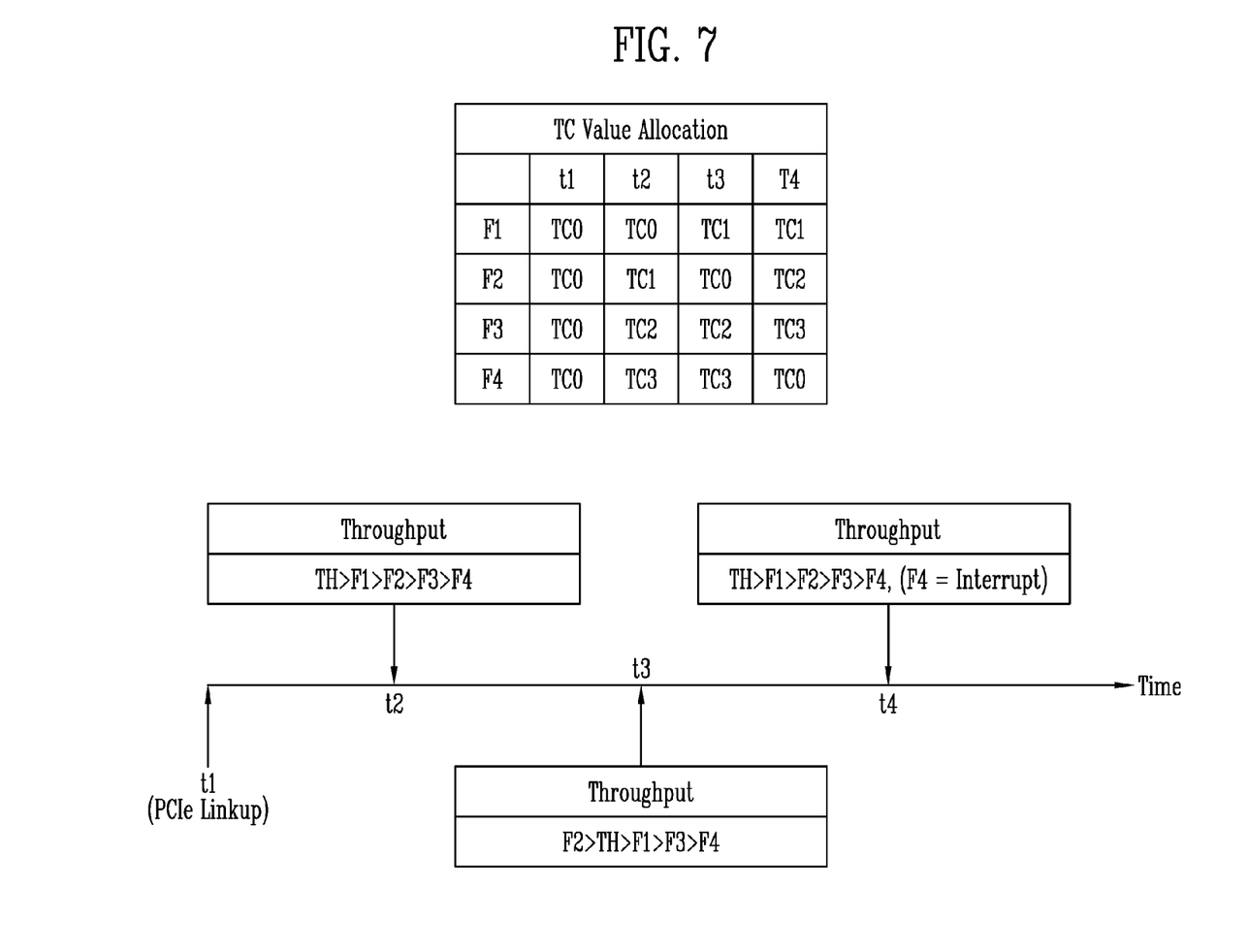
FIG. 7 illustrates a method of allocating traffic class values based on throughputs for respective functions according to an embodiment of the present disclosure.

FIG. 7 illustrates a method of allocating traffic class values based on throughputs for respective functions according to an embodiment of the present disclosure.

Referring to FIG. 7, the throughput of each function may be determined based on the number of transaction layer packets processed through a data path per unit time. A ranking of the throughputs of the respective functions may indicate a ranking of occupation rates of the respective functions for the data path.

The number of traffic class values to be allocated may be the same as the number of functions. In FIG. 7, traffic class values TC0 to TC3 may be allocated to transaction layer packets received from first to fourth functions F1 to F4. As a traffic class value is larger, a corresponding transaction layer packet may be set to have a higher priority. In another embodiment, as the traffic class value is smaller, the corresponding transaction layer packet may be set to have a higher priority.

At a time t1, the traffic class value TC0, which is a default value, may be allocated as all of traffic class values of the transaction layer packets received from the respective functions. The time t1 may be a time point at which a PCIe link is established (Linkup).

At a time t2, the throughputs of the first to fourth functions F1 to F4 may be less than a threshold value TH. The ranking of the throughputs may be decreased in an order of the first function F1, the second function F2, the third function F3, and the fourth function F4.

In an embodiment, when the throughputs of the first to fourth functions F1 to F4 are less than the threshold value TH, the traffic class values may be allocated in a reverse order of the ranking of the throughputs of the first to fourth functions F1 to F4. Therefore, the traffic class value TC0, which is the lowest traffic class value, may be mapped to a transaction layer packet of the first function F1 having the highest rank in throughput. The traffic class value TC1 greater than the traffic class value TC0 may be mapped to a transaction layer packet of the second function F2. The traffic class value TC2 greater than the traffic class value TC1 may be mapped to a transaction layer packet of the third function F3. The highest traffic class value TC3 greater than the traffic class value TC2 may be mapped to a transaction layer packet of the fourth function F4 having the lowest rank in throughput.

At a time t3, the throughput of the second function F2 may be greater than the threshold value TH.

In an embodiment, when a throughput of a function is greater than the threshold value TH, the default value TC0 may be allocated, as a traffic class value, to a transaction layer packet received from the corresponding function. Therefore, the traffic class value TC0, which is the default value, may be allocated to the transaction layer packet of the second function F2 for which the throughput is greater than the threshold value TH.

At this time, the throughputs of the first, third, and fourth functions F1, F3, and F4 may be less than the threshold value TH. Therefore, the traffic class values TC1 to TC3, which are not yet allocated, may be allocated to transaction layer packets in the reverse order of the ranking of the throughputs of the first, third, and fourth functions F1, F3, and F4.

For example, the lowest traffic class value TC1, among the traffic class values TC1 to TC3 which are not yet allocated, may be allocated to the transaction layer packet of the first function F1 having the highest rank in throughput among the first, third, and fourth functions F1, F3, and F4. The traffic class value TC2 may be allocated to the transaction layer packet of the third function F3. The traffic class value TC3 may be allocated to the transaction layer packet of the fourth function F4.

At a time t4, the throughputs of the first to fourth functions F1 to F4 may be less than the threshold value TH. The ranking of the throughputs may be decreased in the order of the first function F1, the second function F2, the third function F3, and the fourth function F4. However, at this time, the fourth function F4 may be an interrupted function.

In an embodiment, the default value TC0 may be allocated to a transaction layer packet received from the interrupted function. Therefore, the default value TC0 may be allocated to the transaction layer packet of the fourth function F4.

Since the throughputs of the first, second, and third functions F1, F2, and F3 are less than the threshold value TH, the traffic class values TC1 to TC3, which are not yet allocated, may be allocated to transaction layer packets in the reverse order of the ranking of the throughputs of the first, second, and third functions F1, F2, and F3.

For example, the lowest traffic class value TC1, among the traffic class values TC1 to TC3 which are not yet allocated, may be allocated to the transaction layer packet of the first function F1 having the highest rank in throughput among the first, second, and third functions F1, F2, and F3. The traffic class value TC2 may be allocated to the transaction layer packet of the second function F2. The traffic class value TC3 may be allocated to the transaction layer packet of the third function F3.

As described above with reference to FIG. 7, when the ranking of throughputs of functions varies or when the interruption occurs, the traffic class values may be reallocated to transaction layer packets.

In an embodiment of the present disclosure, the ordering of transaction layer packets may be performed by the switch or the root complex depending on traffic class values allocated to the transaction layer packets. For example, in the case where a high traffic class value is allocated to a transaction layer packet, a rank of processing the corresponding transaction layer packet in the switch or the root complex may be increased compared to the case where a low traffic class value is allocated to the corresponding transaction layer packet.

In accordance with an embodiment of the present disclosure, the PCIe interface device may allocate the traffic class value TC0, which is the lowest default value, to a transaction layer packet of a function when the throughput of the corresponding function is greater than the threshold value. The PCIe interface device may allocate traffic class values in a reverse order of a ranking of throughputs of functions when the throughputs of the functions are less than or equal to the threshold value. In this way, as an occupation rate of a function is lower within a range in which the throughput of the function is not greater than the threshold value, a higher traffic class value may be allocated to transaction layer packets of the function, thus enabling the occupation rates of respective functions to be equally achieved. Therefore, the PCIe interface device may achieve uniform QoS for the respective functions in a multi-function environment.

Figure 8:
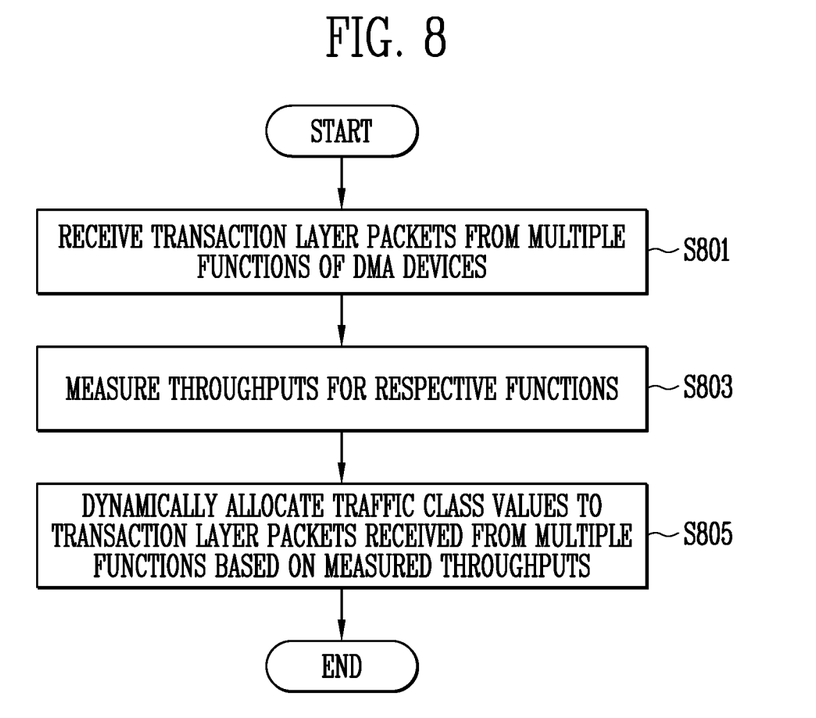
FIG. 8 is a flowchart illustrating an operation of a PCIe interface device according to an embodiment of the present disclosure.

FIG. 8 is a flowchart illustrating an operation of a PCIe interface device according to an embodiment of the present disclosure.

Referring to FIG. 8, at S801, the PCIe interface device may receive transaction layer packets from multiple functions of DMA devices.

At S803, the PCIe interface device may measure throughputs for the respective functions. The throughput of each function may be determined based on the number of transaction layer packets processed through a data path per unit time.

At S805, the PCIe interface device may dynamically allocate traffic class values to transaction layer packets received from the multiple functions based on the measured throughputs. A method of allocating the traffic class values will be additionally described below with reference to FIGS. 9 and 10.

Figure 9:
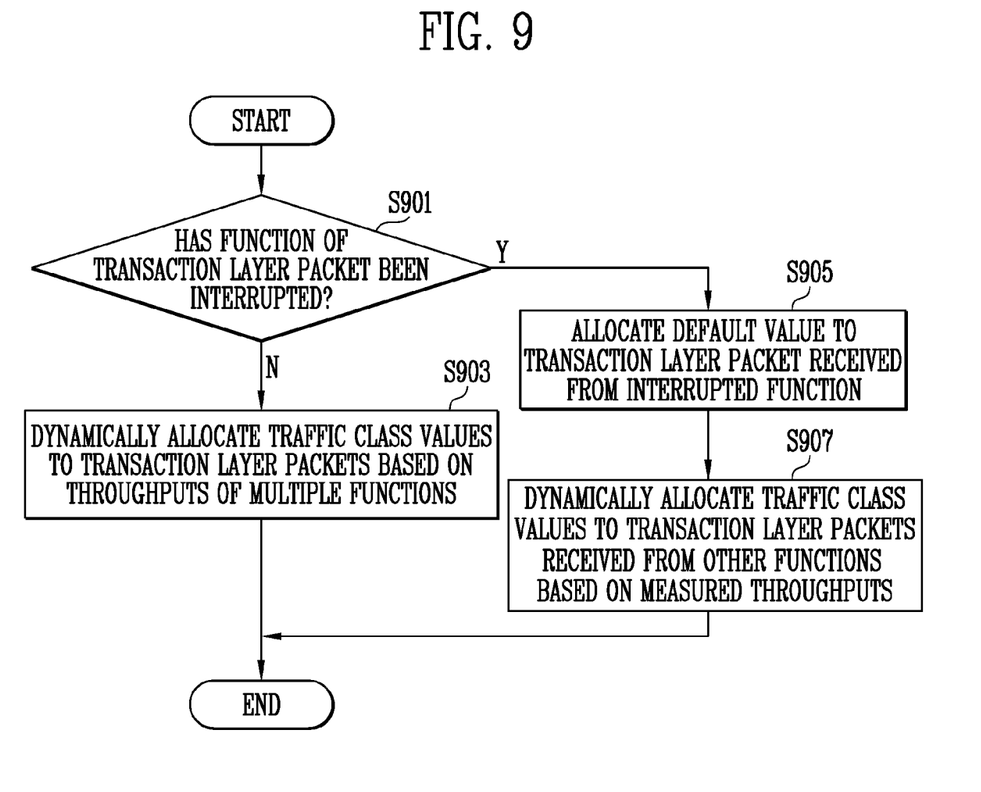
FIG. 9 is a flowchart illustrating a method of allocating traffic class values according to an embodiment of the present disclosure.

FIG. 9 is a flowchart illustrating a method of allocating traffic class values according to an embodiment.

Referring to FIG. 9, at S901, the PCIe interface device may determine whether a function of a received transaction layer packet has been interrupted, i.e., whether there is an interrupted function. The PCIe interface device proceeds to S905 when there is the interrupted function, and proceeds to S903 when there is no interrupted function.

At S905, the PCIe interface device may allocate a default value, as a traffic class value, to a transaction layer packet received from the interrupted function.

After that, at S907, the PCIe interface device may dynamically allocate the remaining traffic class values to transaction layer packets received from the other functions than the interrupted function based on the throughputs of the other functions.

When there is no interrupted function, at S903, the PCIe interface device may dynamically allocate the traffic class values to transaction layer packets received from the multiple functions based on the throughputs of the multiple functions.

Figure 10:
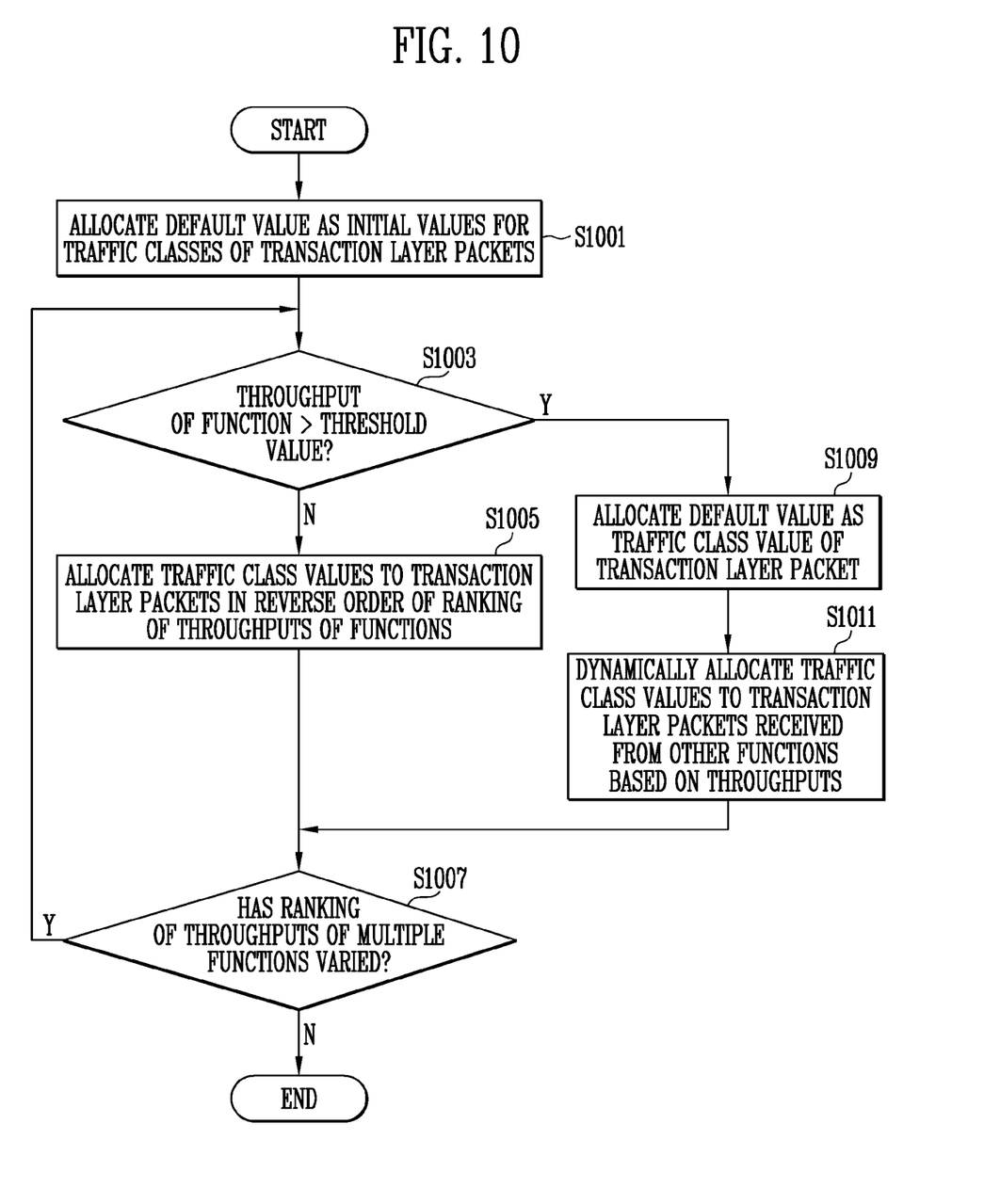
FIG. 10 is a flowchart illustrating a method of allocating traffic class values according to an embodiment of the present disclosure.

FIG. 10 is a flowchart illustrating a method of allocating traffic class values according to an embodiment.

Referring to FIG. 10, at S1001, the PCIe interface device may allocate a default value as initial values for traffic classes of received transaction layer packets.

At S1003, the PCIe interface device may determine whether the throughput of each function is greater than a threshold value. The PCIe interface device proceeds to S1009 when the throughput of the function is greater than the threshold value, and proceeds to S1005 when the throughput of the function is less than or equal to the threshold value.

At S1005, the PCIe interface device may dynamically allocate traffic class values to transaction layer packets in a reverse order of a ranking of the throughputs of multiple functions when the throughputs are less than or equal to the threshold value.

At S1007, the PCIe interface device may determine whether the ranking of the throughputs of the multiple functions has varied. When the ranking of the throughputs has varied, the PCIe interface device returns to S1003, whereas when the ranking of the throughputs has not varied, the PCIe interface device terminates the operation.

At S1009, the PCIe interface device may allocate the default value as the traffic class value of the transaction layer packet received from the function for which the throughput is greater than the threshold value.

After that, at S1011, the PCIe interface device may dynamically allocate the remaining traffic class values to transaction layer packets received from the other functions than the function for which the throughput is greater than the threshold value based on the throughputs of the other functions. Then, the PCIe interface device proceeds to S1007.

In accordance with the present disclosure, there are provided a PCIe interface device that provides uniform quality of service (QoS) for respective functions and a method of operating the PCIe interface device.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

What is claimed is:

1. A Peripheral Component Interconnect Express (PCIe) interface device, comprising:
    a performance analyzer configured to calculate throughputs of multiple functions executed on one or more Direct Memory Access (DMA) devices by counting a number of transaction layer packets transferred between the one or more DMA devices and a host system per unit time; and
    a traffic class controller configured to allocate traffic class values to transaction layer packets received from the multiple functions based on the throughputs of the multiple functions, and to reallocate the traffic class values of the transaction layer packets when rankings of the throughputs of the multiple functions are changed,
    wherein the traffic class values indicate virtual channels to which the transaction layer packets are mapped.

2. The PCIe interface device according to claim 1, wherein the performance analyzer is configured to calculate the throughputs of the multiple functions based on occupation rates of the multiple functions for a data path that couples the one or more DMA devices to the PCIe interface device.

3. The PCIe interface device according to claim 2, wherein the performance analyzer is configured to calculate an occupation rate of each of the multiple functions based on the number of transaction layer packets transferred through the data path per unit time.

4. The PCIe interface device according to claim 1, wherein the traffic class controller is configured to allocate a default value as initial values for traffic classes of the transaction layer packets received from the multiple functions.

5. The PCIe interface device according to claim 4, wherein the traffic class controller is configured to allocate different traffic class values to the transaction layer packets based on results of comparing the throughputs of the multiple functions with a threshold value.

6. The PCIe interface device according to claim 5, wherein the traffic class controller is configured to allocate the default value as a traffic class value of a transaction layer packet received from a function for which a throughput is greater than the threshold value, among the multiple functions.

7. The PCIe interface device according to claim 5, wherein the traffic class controller is configured to allocate a ranking of traffic class values to transaction layer packets received from functions for which throughputs are less than or equal to the threshold value, among the multiple functions, in a reverse order of a ranking of the throughputs of the multiple functions.

8. The PCIe interface device according to claim 4, wherein the traffic class controller is configured to allocate the default value as a traffic class value of a transaction layer packet received from an interrupted function, among the multiple functions.

9. The PCIe interface device according to claim 1, wherein the virtual channels are determined by a switch or a root complex depending on the traffic class values allocated to the transaction layer packets.

10. The PCIe interface device according to claim 9, wherein an order in which the transaction layer packets are to be output is determined by the switch or the root complex based on the virtual channels mapped to the transaction layer packets.

11. The PCIe interface device according to claim 1, wherein the one or more DMA devices comprise one or more of a NonVolatile Memory Express (NVMe) device, a Solid State Drive (SSD) device, an Artificial Intelligence Central Processing Unit (AI CPU), an Artificial Intelligence System on Chip (AI SoC), an Ethernet device, a sound card, and a graphics card.

12. A method of operating a Peripheral Component Interconnect Express (PCIe) interface device, the method comprising:
counting a number of transaction layer packets transferred between multiple functions executed on one or more Direct Memory Access (DMA) devices and a host system per unit time;
calculating throughputs of the multiple functions based on the number of transaction layer packets transferred per unit time;
allocating traffic class values to transaction layer packets received from the multiple functions based on the throughputs of the multiple functions;
outputting the transaction layer packets through virtual channels to which the transaction layer packets are mapped based on the traffic class values; and
reallocating the traffic class values of the transaction layer packets when rankings of the throughputs of the multiple functions are changed.

13. The method according to claim 12, wherein the throughputs of the multiple functions are calculated based on occupation rates of the multiple functions for a data path that couples the one or more DMA devices to the PCIe interface device.

14. The method according to claim 13, wherein an occupation rate of each of the multiple functions is calculated based on the number of transaction layer packets transferred through the data path per unit time.

15. The method according to claim 12, wherein allocating the traffic class values to the transaction layer packets comprises:
allocating a default value as initial values for traffic classes to the transaction layer packets received from the multiple functions; and
allocating different traffic class values to the transaction layer packets based on results of comparing the throughputs of the multiple functions with a threshold value.

16. The method according to claim 15, wherein allocating the different traffic class values to the transaction layer packets comprises:
allocating the default value as a traffic class value of a transaction layer packet received from a function for which a throughput is greater than the threshold value or from an interrupted function, among the multiple functions.

17. The method according to claim 15, wherein allocating the different traffic class values to the transaction layer packets comprises:
allocating a ranking of traffic class values to transaction layer packets received from functions for which throughputs are less than or equal to the threshold value, among the multiple functions, in a reverse order of a ranking of the throughputs of the multiple functions.

18. The method according to claim 12, wherein the virtual channels are determined by a switch or a root complex depending on the traffic class values allocated to the transaction layer packets, and an order in which the transaction layer packets are to be output is determined by the switch or the root complex based on the virtual channels mapped to the transaction layer packets.

* * * * *